Figure 1:
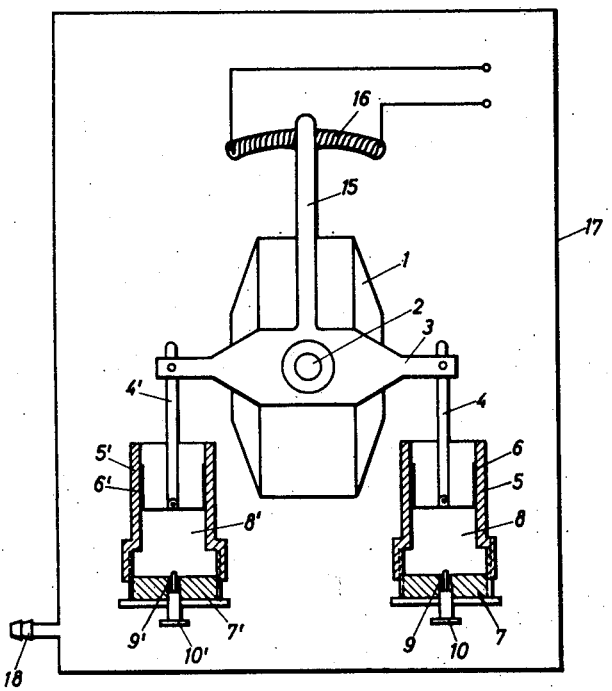

WALDEMAR MÖLLER
INVENTOR.

United States Patent Office 3,142,181
Patented July 28, 1964

3,142,181
DAMPED GYROSCOPE FOR CONTROL PURPOSES
Waldemar Möller, Uberlingen (Bodensee), Germany, assignor to Bodenseewerk Perkin-Elmer & Co., G.m.b.H., Uberlingen (Bodensee), Germany
Filed July 17, 1959, Ser. No. 827,770
Claims priority, application Germany June 16, 1958
1 Claim. (Cl. 74—5)

This invention relates to a damped gyroscope for control purposes.

As is well known, with such a gyro the moment of rotation effective on the precession axis is proportional to the angular velocity about the axis of sensitivity. One way of measuring this precession moment of rotation is to damp the precession axis to a mid-position by means of springs and connect a pneumatic piston and cylinder with the precession axis. With such damped gyroscopes, the deflection of an indicator or other member supported by the damped precession axis is proportional to the angular velocity.

The invention has for its primary object the elimination of certain disadvantages of the metallic damping springs. It is particularly intended to eliminate undesirable aging phenomena and fatigue of material which may be due to temperature variation.

It is a further object of the invention to make the spring constant of the damping members sensitively adjustable and variable.

According to the invention, these objects are accomplished by omitting metallic damping springs. The air cushion of the attenuation device is used as the only spring element for the damping of the precession axis. Damping of the precession axis is advantageously effected by means of two pneumatically elastic attenuation devices operating in opposite directions.

As is well known, the spring constant of an air cushion depends on the volume of air to be compressed. It is thus possible, for the purpose of varying the spring constant, to make the size of the compression space of the attenuation device adjustable, so that a more or less tough spring damping is obtainable. The spring constant of the air cushion depends also on the pressure in the compression chamber when the gyro is set at zero. If the gyro is used for the control of aircraft, this pressure may be varied as a function of the altitude and rate of flying speed. The control values to be tapped from the gyro can thus be automatically adapted to conditions of flight such as altitude and flying speed.

A particlular advantage offered by air cushion damping of the gyroscope is that it permits integration of the turning speed without the use of intermediate members.

The integration effect is obtained by providing the compression chamber of the attenuation device with an adjustable exit throttle opening. The flow of air passing through the throttle opening then corresponds to the integral of the turning speed. The deflection of a pickoff member mounted on the precession axis is proportional to a sum value formed of the turning speed and the change of direction (integral of turning speed). The component values are adjustable individually and independently of each other.

The housing for the gyro and the attenuation device is advantageously of the pressure tight type and connected to a source of compressed air, a pressure head tube, for instance. If the pressure in the gyro housing varies, only the spring constant of the air cushion ($n$) damping the precession axis will vary. The integral forming function described will not become untrue due to such a pressure variation.

It is of primary importance in a control gyroscope operating in accordance with this principle that the throttle opening be adjustable with high sensitivity and with great accuracy. It has been found advantageous for the adjustment of the throttle opening to use a needle valve guided in a long borehole that is coaxial with the throttle opening. The valve needle is screwed into a threaded eyelet which has been made yielding by a slot provided in it. Such a design of the needle valve guarantees an always concentric position of the valve needle that is rotatable in the thread, so that a great accuracy of adjustment may be obtained.

An embodiment of the invention is illustrated schematically in the accompanying drawings and more fully explained in the following detailed description.

In the embodiment selected for illustration, numeral 1 designates a gyro impeller housing, in which a pneumatically or electrically driven gyro impeller revolves with high speed. Housing 1 is arranged to swing about a precession axis 2 perpendicular to the plane of the drawing. A bridge element is designated by numeral 3 and which is rigidly connected with the housing 1 and may also swing about the precession axis 2. Element 3 has pivoted at each of its ends a piston rod 4, 4'. On each piston rod 4, 4' is mounted a piston 6, 6' which is arranged to slide sealingly in a cylinder 5, 5'. The bottom of each of cylinders 5, 5' is formed by a threaded plug 7, 7' which is screwed into the respective cylinder and by which the volume of the compression chamber 8, 8' may be varied. The compression chamber 8, 8' has an exit throttle opening 9, 9' which may be sensitively adjusted by means of a needle valve 10, 10'.

Figure 2:
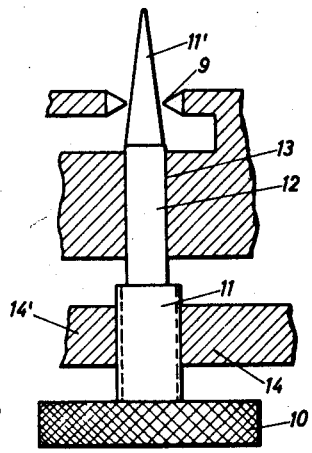

FIG. 2 shows a needle valve 10 illustrated schematically in an enlarged scale. The valve needle 11 which penetrates with its point 11' through the throttle opening 9 has a relatively long cylindrical shaft 12 which is guided with close fit in a bore 13. The threaded end of the valve needle 11 is screwed into an eye 14 which is provided with a slot 14' so as to have somewhat yielding property. Thus, the thread does not obstruct the accurate axial guide 12/13 of the valve needle 11 which is absolutely necessary for the fine adjustment of the throttle opening 9.

An arm 15 which is designed as the pickoff member of a fine wire potentiometer 16 is connected with the bridge member 3.

The system described above comprising parts 1 to 16 is accommodated within a pressure tight housing 17 which has a connection socket 18.

The control gyro described may be used for the position control and stabilization of flying or floating craft when the control values from the potentiometer 15/16 are fed to a steering engine or servo-unit. If the system is used for the control of aircraft, the socket 18 is connected to a pressure head tube, so that the pressure inside the housing 17 is a function of both flying speed and altitude.

In the event of a deviation of the aircraft from its normal position, a moment of rotation about the precession axis 2 is produced. The gyro 1 is damped to its mid-position by means of the bridge member 3 which is supported at both ends by the elastic air cushions provided in the compression chambers 8, 8'. The deflection of the pickoff member 15 about the precession axis 2 is thus attenuated and, in addition, depends on the spring constant of the air cushions 8, 8'. The volume of the compression chambers 8, 8' may be varied by the threaded plugs 7, 7' and the spring constant of the air cushions adapted to the stability properties of the aircraft. A certain quantity of air which depends on the position of the valve needle 11 passes, under the influence of the moment of rotation, through the throttle openings 9, 9'. In this manner, the deflection of the pickoff member 15 is increased by an amount which corresponds to the integral of the turning speed, i.e., the deviation of the aircraft from its position. A value is therefore picked from the potentiometer 15/16 as a control value which is a function of both the turning speed and the position deviation of the aircraft. The magnitude of each component may be adjusted by means of the threaded plugs 7, 7', and the needle valves 10, 10'.

Since the effectiveness of a certain angular displacement of the control surface depends, of course, on the flying speed and the altitude of flight, these values have up to now been additional inputs to the control surface. With the control system of the invention, however, this is no longer necessary, since it is possible to obtain an automatic correction of the control values picked from the gyro by connecting housing 17 to a pressure head transmitter. The spring constant of the air cushions 8, 8' then varies as a function of the pressure head, so that the deflections of the pickoff 15 become smaller if the pressure head increases.

It will now be apparent that, as the aircraft deviates from the desired flight path, the pick-off element 15 of the gyro will be deflected. The deflection will represent the sum of a component proportional to the angular velocity of the aircraft and a component proportional to the integral of the angular velocity. So long as such an angular velocity and the resulting precession torque of the gyro exist, gyro pick-up 15 will not return to its central position. When the aircraft ceases to deviate from its flight path, a certain deflection of pick-up 15 will exist. This results in the application of a signal to the proper control surface servomotor. As a result, the aircraft is returned to its original flight path and thereby creates a precession torque on the gyro opposite to that previously existing. The angle through which the aircraft is rotated in returning to its original flight path, is equal to the angle through which it had previously deviated. At the moment the aircraft returns to its original flight path the signal received from the gyro becomes zero and element 15 will have returned to its central position.

I claim:

Aircraft gyroscopic control apparatus comprising a rotor having a spin axis adapted to rotate about a precession axis; piston means and cylinder means separated by a compressible gaseous fluid and connected with said rotor as the sole elements simultaneously limiting the degree of rotation of said spin axis about said precession axis and damping said rotation within the limits so established; enclosure means surrounding said rotor, piston, and cylinder means; and conduit means interconnecting said enclosure means and the atmosphere surrounding the aircraft.

References Cited in the file of this patent

UNITED STATES PATENTS

| | | |
|---|---|---|
| 944,511 | Wurl et al. | Dec. 28, 1909 |
| 2,765,054 | Rossman | Oct. 2, 1956 |
| 2,836,070 | Stokes et al. | May 27, 1958 |
| 2,851,886 | Kuipers | Sept. 16, 1958 |
| 2,852,941 | Johnston | Sept. 23, 1958 |
| 2,899,702 | Voster et al. | Aug. 18, 1959 |

FOREIGN PATENTS

| | | |
|---|---|---|
| 762,091 | Germany | Feb. 9, 1953 |
| 340,327 | Great Britain | Jan. 1, 1931 |